(No Model.)  F. G. W. J. ADAMS.  4 Sheets—Sheet 1.
ELECTRIC LANTERN.

No. 603,882. Patented May 10, 1898.

Witnesses:
F. Nelson.
Ch. Poulot

Inventor
Frederick George William James Adams
By L. K. Böhm,
his Attorney.

(No Model.)  F. G. W. J. ADAMS.  4 Sheets—Sheet 3
ELECTRIC LANTERN.
No. 603,882.  Patented May 10, 1898.

(No Model.)　　　　F. G. W. J. ADAMS.　　4 Sheets—Sheet 4.
ELECTRIC LANTERN.

No. 603,882.　　　　　　　　Patented May 10, 1898.

Witnesses:　　　　　　　　　　　　Inventor:
　　　　　　　　　　　　Frederick George William James Adams
　　　　　　　　　　　　By　　　　　　,
　　　　　　　　　　　　　　　Attorney.

UNITED STATES PATENT OFFICE.

FREDERICK GEORGE WILLIAM JAMES ADAMS, OF LONDON, ENGLAND.

ELECTRIC LANTERN.

SPECIFICATION forming part of Letters Patent No. 603,882, dated May 10, 1898.

Application filed April 24, 1897. Serial No. 633,684. (No model.) Patented in England July 7, 1891, No. 11,526, and in France April 18, 1893, No. 229,458.

*To all whom it may concern:*

Be it known that I, FREDERICK GEORGE WILLIAM JAMES ADAMS, a subject of the Queen of England, residing at Greenwich, London, Kent county, England, have invented certain new and useful Improvements in Electric Lanterns, (for which I have received an English patent, No. 11,526, dated July 7, 1891, and a patent in France, No. 229,458, dated April 18, 1893,) of which the following is a specification.

My invention relates to improvements in the construction and arrangement of the parts of portable electric batteries and lamps.

Figure 1:
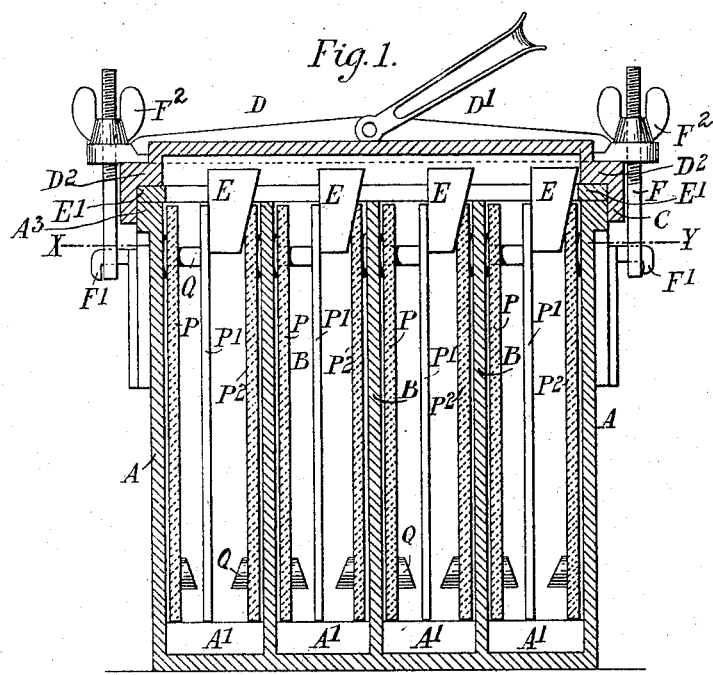
Figure 2:
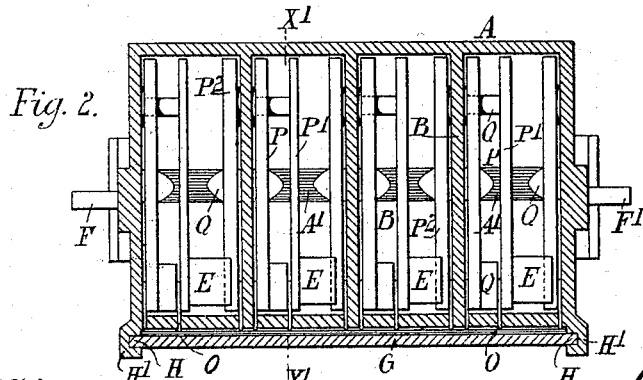
Figure 3:
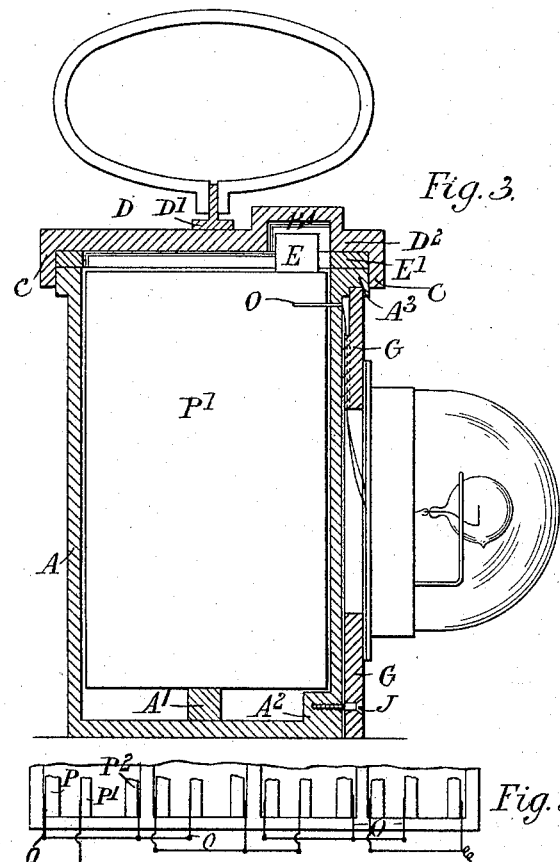
Figure 4:
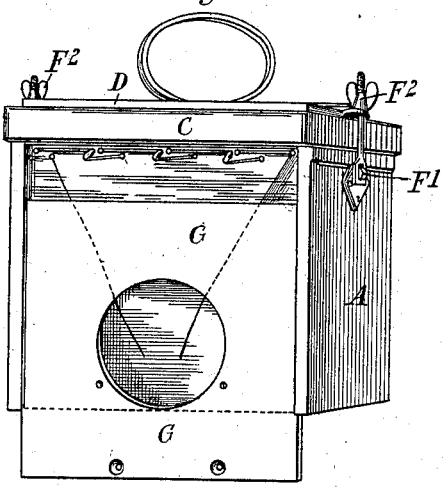
Figure 7:
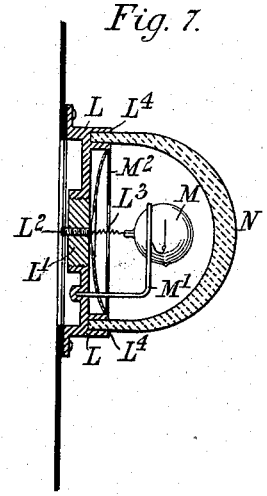
Figure 8:
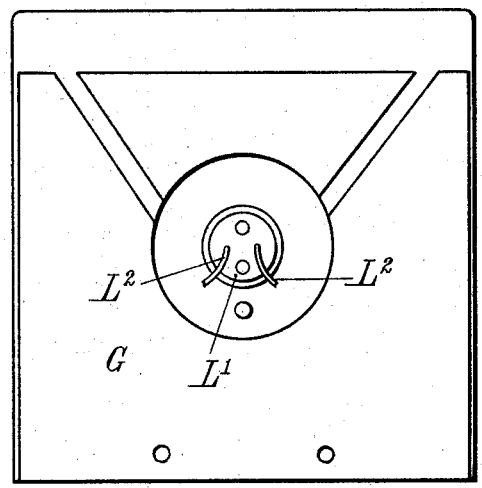

Figure 1 is a sectional elevation of a single-fluid battery as arranged for a portable lamp. Fig. 2 is a sectional plan of the same on the line $x\,y$, Fig. 1. Fig. 3 is a sectional end view on the line $x'\,y'$, Fig. 2. Fig. 4 is a perspective view of the front of the battery, showing the arrangement of sliding front to which the incandescent lamp is attached. Fig. 5 is a diagrammatic view of the mode of connecting the electrodes. Fig. 6 is a detached perspective view of one of the plates. Fig. 7 is a sectional view of an improved lamp arrangement. Fig. 8 is a back view of Fig. 7.

I form a battery, which may comprise any desired number of cells, by stamping or pressing the same in one piece out of india-rubber or other suitable non-conducting material while in a plastic condition. When employing india-rubber, I use it when prepared for vulcanizing and vulcanize it when the required shape has been given to it.

The outside case A of a battery is internally divided into a number of cells by partitions B. Around the top of the casing A is a rim $A^3$, upon which the cover of the battery can be fitted, so as to make a good joint and prevent the acid contents of the cells from being spilled. The partitions B are carried, as shown, up to the same level as the outer casing.

$A'$ is a ridge formed in the bottom of each cell and molded in one with the casing A, upon which the plates of the battery rest. The use of this ridge is to keep the foot of the plates from contact with any sediment that may accumulate at the bottom of the cells. Blocks $A^2$ are also molded in the bottom of the cells, as shown in Fig. 3, to receive screws for securing a sliding front hereinafter described.

Upon the front of the battery there is formed an overhanging ridge, (shown in Figs. 2, 3, and 4,) by means of which a sliding plate, carrying the incandescent lamp and fitting, can be attached to the battery.

A cover D to be applied to such a battery is shown in section in Figs. 1 and 3. The sides of this cover are brought down, as at C, to embrace the rim $A^3$. Upon the upper surface of this rim the cover rests by its flat surface $D^2$, which may or may not be covered with suitable packing $E'$, such as soft india-rubber, for the purpose of making an acid-proof joint. A longitudinal recess $B'$ in the cover D receives the projecting ends of wedges E, by which the electrodes are held in position against the sides of the contact-pieces. For the purpose of securing the cover to the battery I use a metal strap $D'$, (shown in Figs. 1 and 3,) which is of T-section and runs the whole length of the cover, projecting beyond at either end for the purpose of receiving the ends of a pair of screwed eyebolts F, which hook on corresponding hooks $F'$ on the battery-case and are tightened up and held in place by means of nuts $F^2$. By this means the cover is held firmly in position. The cover is provided with a handle.

A sliding front G, Figs. 3 and 4, for carrying the incandescent lamp and fittings runs in grooves H, formed in the overhanging ridges $H'$, molded on the front of the battery-case A, and is held in position by screws J. These overhanging ridges protect the upper and side edges of the sliding front and the parts covered by it from "creeping" acid— that is to say, from acid issuing from the battery and diffused by convection or otherwise over its surface.

An arrangement of electric-lamp fittings to be used in connection with a battery such as described is shown in section in Fig. 7 and in position on the front of the battery in Fig. 3. The base L is formed by stamping or pressing and may be constructed of metal or other suitable material not necessarily nonconductive of electricity. As electrolyte I prefer to use an exciting fluid, for which I have made application for Letters Patent of the United States; but any single-fluid electrolyte may be employed. Into its center is introduced a piece L', of insulating material, preferably vulcanite, which may be screwed into position. Through the piece L' are passed two metal conductors $L^2$, to which are attached springs $L^3$ for making contact with the terminal hooks of the lamp M. A switch for turning off the current when the light is not required may be introduced at any convenient point in the circuit. Upon the front of the lamp-fitting may be formed a recess $L^4$ for receiving the edge of a protective glass cover or lens N, and a lamp-holder M' may be fixed and adjusted in position by screwing it into the front of the base L and then hooking the lamp onto the springs shown in Fig. 7. A reflector $M^2$, formed from a stamped and enameled metal plate having openings through which the springs $L^3$ and the lamp-holder M' can pass, may be held within the inner flange of the flanged recess $L^4$, as shown. The conductors leading from the battery may be best connected to the leads of the lamp-fitting by soldering, which must be done when the sliding front is in position. The base L may be secured by screws or other convenient means to the sliding front.

For the purpose of making contact between the electrodes contained in the cells of my battery and the external conductors I pass through the cell-walls screwed metal pegs or contact-pieces O, adapted to resist the attacks of the acid used for charging the battery. The pegs O project within the walls' cells, so that electrical contact may be effected by causing the electrodes to press against the sides of the pegs, as shown in Fig. 5. These pegs will of course have their conductive power in proportion to the amount of current required from the battery. Thus, for example, in a mining-lamp having plates with an active surface not exceeding ten square inches to every plate the pegs may be formed of wire of about 16 Birmingham wire-gage or .065 inches in diameter and project within the cell-walls to a distance of about three-eighths of an inch. To insure a good contact at these points, the wedges E are pressed home between the plates $F'$ $F^2$, forcing them on either side against the pegs with such pressure as is desirable.

The external ends of the pegs O may be connected up to the external conductors in any ordinary or suitable manner.

For a battery such as here described I prefer to use two electrodes, of which the negative consists of two members, one member being fixed in position, while the other member and the positive electrode are held in position by wedges E, of insulating material, preferably of vulcanized rubber, the top part of the loose negative electrode $P^2$ being tapered to take the tapered wedges E, as shown. In the construction of these electrodes I provide at suitable points small blocks or studs Q, of insulating material, to be carried by the electrodes for the purpose of preventing their coming in contact with one another, and thus giving rise to short-circuiting in case of their not being accurately adjusted in their intended positions.

If preferred, the conductor from the battery may be connected to two terminals on the sliding front G, the lamp being in this case connected up to the terminals after it is affixed to the plate G.

As electrolyte any of the well-known single-fluid electrolytes may be used. I prefer, however, to use an exciting fluid made of chromates and mercury salts; but I do not claim in this application this specific electrolyte, having made application therefor on the 29th day of March, 1897, Serial No. 629,824.

I claim—

1. In an electric lantern, the combination with a casing A having partitions B, of blocks $A'$ $A^2$ at the bottom of the casing electrodes with insulating-stops, wedges E for securing the electrodes, overlapping cover D provided with metal strap D', contact-pegs O, conductors and sliding front G covering the conductors and carrying the lamp and fittings substantially as set forth.

2. In an electric lantern a battery consisting of the casing A having partitions B, blocks $A'$, $A^2$ at the bottom and rim $A^3$ all integral therewith, two electrodes in each cell of which the negative consists of two members, one negative member being fixed, while the other and the positive electrode are held in position by wedges, overlapping cover D provided with metal strap, D', contact-pegs O and means for securing the cover, substantially as described.

3. In an electric lantern a battery-casing consisting of the case A having integral therewith partitions B blocks $A'$, $A^2$ at the bottom rim $A^3$ and grooves H in front, for receiving a sliding plate G overlapping cover D provided with metal strap D' with longitudinal recess B', means for securing the cover to the case and a handle, substantially as described.

4. In an electric lantern the combination with a casing A having ridges H' and grooves H of a sliding front G, base-piece L attached to the sliding front and provided at its center with piece L' of insulating material, the conductors $L^2$ passing through said piece L', an electric lamp M, a reflector $M^2$ and lens N, substantially as described.

In testimony whereof I have hereto set my hand in the presence of the two subscribing witnesses.

FREDERICK GEORGE WILLIAM JAMES ADAMS.

Witnesses:
   WM. G. WILDE,
   N. E. BELLAMY.